3,180,834
PROCESS FOR SOLUTION OF NITROSYL SULFURIC ACID
Bela I. Karsay, East Orange, and Anthony W. Yodis, Whippany, N.J., assignors to Allied Chemical Corporation, New York, N.Y., a corporation of New York
No Drawing. Filed Apr. 30, 1963, Ser. No. 277,009
12 Claims. (Cl. 252—101)

This invention relates to processes for making solutions of nitrosyl sulfuric compounds, such as nitrosyl sulfuric acid ($NO.SHO_4$), in sulfuric acid. Products manufactured by processes of the invention are useful in nitrosation operations, and also may be considered as concentrates which, when diluted with 93-98% sulfuric acid at the point of use, provide cleaning-agent solutions which may be used in large-scale cleaning operations, for example in connection with the removal of organic incrustations from industrial equipment.

Previously, solutions similar to those which may be formed from the herein concentrates have been made at the point of use by addition of solid nitrosyl sulfuric anhydrides ($N_2S_2O_9$) to sulfuric acid. Solid nitrosyl sulfuric anhydride, a hydroscopic relatively low melting material, is a notably high priced product because of the requirements of expensive raw materials and close process control in manufacture.

Objectives of the invention are to avoid the high costs and operational difficulties involved in the manufacture and handling of solid nitrosyl sulfuric anhydrides, and to afford processes for the direct synthesis, from inexpensive raw materials, of sulfuric acid solutions of nitrosyl sulfuric compounds, such as $NO.HSO_4$, of any desired nitrosyl sulfuric compound strength.

In accordance with the invention, it has been found that simultaneous reduction of nitric acid to $N_2O_3$ and oxidation of elemental sulphur to $SO_3$ may be effected, and that nitric acid, elemental sulfur, and sulfur trioxide furnished e.g. as the free $SO_3$ of fuming sulfuric acid (oleum) may be reacted in a single reaction step to form nitrosyl sulfuric compound in solution in sulfuric acid.

Considering the nitrosyl sulfuric compound formed as nitrosyl sulfuric acid, reduction of nitric acid to $N_2O_3$, oxidation of elemental sulphur to $SO_3$, and further reaction to $NO.HSO_4$ may be represented by (1)    $6HNO_3 + 2S \rightarrow 3N_2O_3 + 2SO_3 + 3H_2O$ and (2)    $N_2O_3 + 2SO_3 + H_2O \rightarrow 2NO.HSO_4$

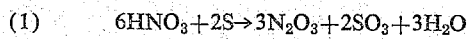
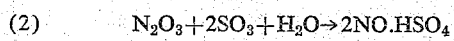

In reactions of this type, the quantities of $SO_3$ and $H_2O$ formed by the direct reaction of nitric acid and elemental sulfur are, with regard to ultimate requirements, respectively a deficiency of $SO_3$ and an excess of $H_2O$. In accordance with one aspect of the invention, it has been found that, by use of fuming sulfuric acid or equivalent $H_2SO_4$ and $SO_3$ components, it is conveniently possible not only to make up the deficiency of $SO_3$ and to eliminate excess water, but also to supply to the reaction mass the $H_2SO_4$ needed as a major constituent of the ultimate product, i.e. nitrosyl sulfuric compound in solution in sulfuric acid. In one representative preferred embodiment, overall reaction in accordance with the invention may be represented by (3)   $6HNO_3 + 8H_2SO_4 + 4SO_3 + 2S \rightarrow 6NO.HSO_4 + 8H_2SO_4$

Hence, reactants involved in practice preferably consist of nitric acid, elemental sulfur and oleum or the equivalent thereof, all of which are readily available raw materials. In view of the discovery of the simultaneous reactability of nitric acid, elemental sulfur and oleum, the invention affords processes which not only constitute one-step reactions, but also make possible the use as bulk reactants of elemental sulfur and oleum which are minimum cost commodities.

General practice of the invention processes comprises bringing together in a suitable reaction zone nitric acid and, based on the amount of nitric acid charged, certain quantities of oleum of certain $SO_3$ strength and certain quantities of elemental sulfur, reacting the nitric acid, elemental sulfur and oleum at relatively low temperatures, and recovering from the resulting reaction mass nitrosyl sulfuric compound in solution in sulfuric acid.

Procedural steps and apparatus involved in all forms of the invention are simple. In one embodiment, nitric acid, and oleum of herein described $SO_3$ strength and quantity and based on the amount of nitric acid charged may be fed at ambient temperature into a closed top reaction vessel provided with an agitator, a temperature control jacket, and a gas ($SO_2$) venting pipe. Thereafter, finely divided elemental sulfur, in hereafter described amount based on the quantity of nitric acid charged, may be gradually added to the mixed liquir in the reactor, rate of addition of sulfur and/or extraneous cooling of the reaction being such as to maintain the reaction mass at a relatively low temperature. On introduction of sulfur, reaction proceeds rapidly to formation of the desired product which is nitrosyl sulfuric compound in solution in sulfuric acid. In this instance, recovery of product entails nothing more than filtration of excess and unreacted elemental sulfur ordinarily present.

Reaction control factors are principally amount of elemental sulfur fed, amount and strength of oleum fed, each of the foregoing amounts being based on the quantity of nitric acid charged, and temperature of reaction.

While nitric acid of weaker $NHO_3$ strength may be employed, the nitric preferably utilized is the usual concentrated nitric acid of commerce running about 98-99% $HNO_3$. In most procedures, particularly in large-scale operations, it is preferred to introduce into the system an incremental amount of oleum sufficient to bring in enough $SO_3$ to offset and convert to $H_2SO_4$ any incidental amount of $H_2O$ which may be a constituent of the nitric acid fed to process. Unless otherwise indicated, "$HNO_3$" is intended to designate substantially 100% nitric acid.

The sulfur utilized may be the ordinary elemental sulful of commerce sized from 10 to 200 mesh, preferably 10 to 100 mesh. It has been found that the principal reaction between nitric acid, sulfur and oleum is characterized by certain side reactions one of which results in formation of sulfur dioxide which appears to be the result of incomplete oxidation or sulfur by nitric acid, which side reaction appears to take place at least to some extent regardless of reaction temperature, but to a higher degree at low temperature than at higher temperature. While in some circumstances, for example when carrying out the reactions under moderate elevated pressure, elemental sulfur may be charged in amount not less than about 0.33 mol proportions per mol of $HNO_3$ charged, we find that generally overall reactions should be effected in the presence of elemental sulfur appreciably in excess of 0.33 mol proportions per mol of $HNO_3$ charged. In the better practice, particularly when working at substantially atmospheric pressure, sulfur introduced should be in amount not less than about 10% in excess of 0.33 mol proportion per mol of $HNO_3$ charged, and more usually sulfur excess may be upwards of 20%.

Second reaction control factor of importance is the $SO_3$ strength of and total amount of oleum used in a given operation. Unless otherwise indicated "$H_2SO_4$" herein is intended to designate substantially 100% sulfuric acid. As known, oleum consists of $H_2SO_4$ and $SO_3$, e.g. so-called "20% oleum" consisting by weight of 80% $H_2SO_4$ and 20% free $SO_3$. The term "oleum" as used herein is intended to include commercial oleum or any equivalent thereof, e.g. 100% $H_2SO_4$ and 100% $SO_3$ mixed or used separately. In the invention processes, oleum effects two functions. Oleum furnishes to the system (a) free $SO_3$ in amount to offset the above-noted $SO_3$ deficiency and to convert excess $H_2O$ to $H_2SO_4$, and (b) the $H_2SO_4$ constituent needed to incorporate in the product the desired amount of $H_2SO_4$ so that the final product is a solution of nitrosyl sulfuric acid compound in sulfuric acid. $SO_3$ strengths in oleums vary widely, the greater the $SO_3$ strength the less the $H_2SO_4$ content, and vice versa. From standpoint of supply of $SO_3$ to the reaction, it would appear advantageous to use oleums of very high $SO_3$ strength. However, if relatively high-strength oleum were employed a correspondingly small amount of $H_2SO_4$ would be incorporated in the reaction mass and the result might be a product containing a relatively small amount of $H_2SO_4$ and a much larger amount of nitrosyl sulfuric compound, in which case the latter might be present in quantity sufficient to exceed the solubility limits of nitrosyl sulfuric compound in sulfuric acid. Products of the invention are liquids under standard conditions, and preferred products are liquids consisting of not less than about 45% by weight of $H_2SO_4$, balance nitrosyl sulfuric compound. Preferred products include those consisting of as much as 65% by weight $H_2SO_4$, balance nitrosyl sulfuric compound. We find that to afford formation of products which are liquid under standard conditions and to avoid introduction into the reaction of too little $H_2SO_4$, it is preferred to employ oleums of $SO_3$ strengths not greater than about 60%.

As to lower strength oleums, oleum of any appreciable $SO_3$ strength may be employed. However, use of low strength oleum involves incorporation in the reaction mass of a correspondingly larger quantity of oleum in order to bring into the reaction the $SO_3$ needed. While low strength oleums down to say 2 to 10% $SO_3$ strength may be utilized, lower strength oleums are not preferred in most instances because low strength oleums effect too great $H_2SO_4$ dilution of final products. On the basis of a given charge of nitric acid and disregarding the preferred operational excess of sulfur, the following examples (parts by weight) illustrate strengths and quantities of oleum, product composition variations resulting from oleum strength and quantity variations, and relative proportions of $H_2SO_4$ and nitrosyl sulfuric compound in preferred high strength nitrosyl sulfur compound products.

| Ex. | Pts. 100% $HNO_3$ | Pts. of S | Oleum; Percent Free $SO_3$ | Pts. of Oleum | Pts. of Product | Wt. Percent $NO.HSO_4$ in Product | Wt. Percent 100% $H_2SO_4$ in Product |
|---|---|---|---|---|---|---|---|
| A | 1 | 0.17 | 5 | 16.9 | 18.1 | 11 | 89 |
| B | 1 | 0.17 | 22 | 3.9 | 5 | 40 | 60 |
| C | 1 | 0.17 | 30 | 2.9 | 4 | 50 | 50 |
| D | 1 | 0.17 | 34 | 2.5 | 3.7 | 55 | 45 |

It is preferred to use oleum of $SO_3$ strength not less than about 15%, and experience indicates that overall most satisfactory results are obtained when using oleums of $SO_3$ strength substantially in the range of 20–50%.

Similarly to oleum $SO_3$ strengths, quantities of oleum which may be employed vary over a wide range. Selections of quantity of oleum and $SO_3$ strength entail getting into the reaction mass sufficient $SO_3$ and at the same time bringing into the reaction mass not too much and not too little $H_2SO_4$. Hence, $SO_3$ strength and quantity of oleum are more or less inseparably dependent. We find that, after having regard for the above described molecular proportions of $HNO_3$ and sulfur and utilizing an oleum having a free $SO_3$ strength of not more than about 60%, the particular oleum employed should be in amount and of $SO_3$ strength such as (1) to supply to the reaction $SO_3$ in quantity in the range of about 75% less than to 75% more than 0.66 mol proportions of $SO_3$ per mol of $HNO_3$ charged, and (2) to provide in the ultimate liquid reaction product not less than about 0.8 mol of $H_4SO_2$ per mol of $HNO_3$ charged. In the more preferred operations directed to greater insurance of stability of product solution, the particular oleum employed should be in amount and of $SO_3$ strength such as (3) to supply to the reaction $SO_3$ in quantity in the range of about 50% less than to 75% more than 0.66 mol proportions of $SO_3$ per mol of $HNO_3$ charged, and (4) to provide in the ultimate liquid reaction product not less than about one mol of $H_2SO_4$ per mol of $HNO_3$ charged. For a specific operation involving use of a specific amount of $HNO_3$ and taking into consideration the above delineated principles, selection of oleum-$SO_3$ strength and determination of the quantity of such oleum to facilitate production of a predetermined product are within the skill of the art.

A further reaction control factor is temperature. While reaction temperature may be as high as about 158° C., e.g. sulfur fed as an atomized spray, such high temperatures are not preferred. In the better embodiments, temperature should be below the melting point of the elemental sulfur, i.e. a few practicable degrees below about 119° C. In addition to the above noted side reactions resulting in formation of some $SO_2$, under some temperature conditions other side reactions cause significant formation of $NO_2$ and NO probably caused by appreciable hydrolysis of nitrosyl sulfuric compound by some of the water indicated in above Equation 1. While reaction temperatures below ambient, e.g. down to say 10° C. may be employed, temperatures below about 20° C. are not preferred. Practice of all embodiments is such as to retain in the sphere of reaction substantially all of the nitrous gases which may be formed by side reactions. In this connection, we find that nitrous gases may be maintained in the sphere of reaction by use of relatively low temperatures, preferably in the range of about 20–60° C., however, temperatures in the range of about 20–100° C. may be used to advantage. At these temperatures, reactions may be carried out in a reactor equipped with an $SO_2$ outlet pipe in which instance nitrous gas forming side reactions are either substantially inhibited, or in any case there is no notably unsatisfactory evolution of nitrous gases from the reaction mass. Hence, one embodiment of practice may be procedurally along the lines delineated in appended Examples 2 and 3. In this mode of practice, the selected quantities of nitric acid and oleum may be introduced into an agitated jacketed reactor, and thereafter the elemental sulfur may be charged. Reactions are mildly eothexrmic, and reaction temperatures in the range of about 20–60° C. may be maintained by regulation of extraneous cooling or rate of feed of sulfur or both. During reaction, color of liquid phase in the reactor is yellow. End point of reaction is indicated by color change of liquid phase to a bluish hue. Reaction may be completed substantially on termination of sulfur feed or shortly thereafter. Since in most embodiments an appreciable excess of sulfur preferably is employed, the mass on completion of reaction usually contains some sulfur in suspension. The latter may be filtered out, and the filtrate constitutes a product of the invention.

In the above relatively low temperature embodiment, while advantageous with regard to substantially no loss of nitrogen as nitrous gases and operations are commercially acceptable, nonetheless reaction rates are inclined to be slow. In attempts to increase rates of reaction by reaction temperature increase, it was found that nitrous gases formation and evolution increased substantially on increase of reaction temperatures to an extent sufficient to substantially enhance rate of reaction. It was found that this difficulty, potentially involving loss of nitrous gases and correspondingly lower yields, can be adequately overcome by procedure along the lines illustrated in appended Example 1. Such procedure avoids loss of nitrous gases and affords improved reaction rates of the order of 300–400%.

In practice of the instant preferred embodiment, apparatus may be along the lines of that described in Example 1, i.e. apparatus comprising principally an agitated jacketed reactor the gas space of which communicates with the bottom end of a vertically disposed packed column or gas scrubber. In this procedure, the sulfur to be employed is suspended in a liquid reaction medium inert to the reaction. Ordinarily, the reaction medium is the heel or a filtered finished product of a previous operation. Relative amounts of sulfur and liquid reaction medium are non-critical except to the extent that the quantity of liquid medium should be sufficient to facilitate a workable agitated suspension of sulfur. On the basis of a given nitric acid charge, relative amounts of sulfur, and quantity and $SO_3$ strength of oleum may be determined as above.

This modification is characterized by introduction of a sulfur suspension into the reactor, and thereafter charging the nitric acid and oleum to be used to the reaction by feeding nitric acid and oleum preferably simultaneously into the top of the scrubbing tower. To this end, the particular quantities of nitric acid and oleum to be employed may be preliminarily mixed and, subsequent to introduction of the sulfur suspension to the reactor, the nitric acid and oleum mixture is fed at a controlled rate into the top of the scrubbing column, the liquor flowing down through the packing into the reactor. On contact of nitric acid and oleum liquor with sulfur, reaction proceeds with substantial evolution of brown nitrous gases. In this embodiment, reaction temperatures may be as high as a few degrees C below the melting point of sulfur, but are preferably in the range of 70–100° C., temperature maintenance being effected preferably by regulation of extraneous cooling. Nitrous gases evolved in the reactor rise thru the scrubbing tower and countercurrently contact a downflowing mixture of nitric acid and oleum. Depending mostly upon factors such as size of the operation and particular apparatus, rate of feed of nitric acid and oleum to the top of the scrubbing tower is regulated so as to absorb and maintain in the sphere of reaction the nitrous gases evolved. This condition may be determined by the absence, in any gas discharged from the top of the column, of brown nitrous gases and the presence of a relatively small amount of $SO_2$. As before, end point of reaction is indicated by blue coloration of the liquid phase in the reactor pot. In some instances, subsequent to completion of feed of nitric acid and oleum, the mass in the pot may be permitted to stand an hour or so to facilitate completion of reaction. As in the previously described modification, recovery of product from the mass in the reactor pot involves nothing more than filtration preferably while warm to remove unreacted sulfur.

Products of the invention consist of mixtures of sulfuric acid and nitrosyl sulfuric compound, the latter in preferred operation usually being $NO.HSO_4$. However, in some instances whne using non-preferred high strength oleums, e.g. 58–59%, some nitrosyl sulfuric anhydride, $N_2S_2O_9$ may be formed in accordance with—

(4) 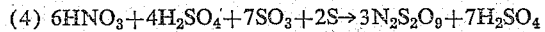

In any event, the nitrosyl sulfuric compounds consist of nitrosyl sulfuric acid and nirtosyl sulfuric anhydride or mixtures of the same. Operations may be continuous or semi-continuous, e.g. by continuously feeding mixed acid and sulfur to the reactor, and continuously drawing off from the reactor a liquor increment and effecting completion of reaction in a separate vessel.

The following illustrate practice of the invention.

Example 1

Apparatus employed comprised a 22 liter jacketed glass reactor, equipped with an agitator and a thermometer. An opening on the topside of the reactor was gastight connected to the lower end of a vertically disposed, 2″ I.D. x 3′ long, gas scrubbing column packed with ¼″ ceramic saddles. The reactor was additionally provided with facilities for charging a liquid reaction medium and ground elemental sulfur, and with means for withdrawing from the reactor final reaction product usually carrying some unreacted elemental sulfur in suspension.

About 4797 g. (2440 mls.) of liquid product of a previous run were charged into the reactor. The liquid consisted of about 2582 g. (20.3 m) of $NO.HSO_4$ and about 2120 g. (21.7 m) of $H_2SO_4$, and about 95 g. (1.2 m) of $SO_3$.

A mixed solution consisting of $HNO_3$, $H_2SO_4$ and $SO_3$ was made up. The $H_2SO_4$ and the $SO_3$ were supplied in the form of approximately 35% oleum. Proportions of $HNO_3$ and 35% oleum used were such as to provide a nitric acid-oleum mixture of approximately the following composition: 60 m (3783 g.) of $HNO_3$; 64.6 m (6331 g.) of $H_2SO_4$; and 42.1 m (3366 g.) of $SO_3$, total weight of the mixture being about 13,480 g.

About 30. gram atoms (955 g.) of ground sulfur, about 50% excess over the theoretical requirements of 20 gram atoms (638 g.) and having a particle size distribution of about 10–100 mesh, were added to the liquid in the reactor, and the resulting agitated slurry was heated to about 70° C.

The above-described nitric acid-oleum mixture was fed into the top of the scrubbing column and then into the reactor at a rate of about 140 g. per minute. On introduction of the mixture, temperature in the reactor began to rise. By extraneous cooling, reactor temperature was held substantially in the range of 85–95° C. throughout the entire run. As reaction initiated and thereafter, the gas space in the reactor was colored dark brown by evolved nitrous gases which rose into the scrubbing column. At the indicated rate of feed of nitric acid-oleum liquid to the column, substantially all nitrous gases were absorbed quantitatively by the downwardly flowing liquid mixture and were returned to the reactor. The only compound detceted exiting the top of the scrubbing tower during the run was a relatively small amount of sulfur dioxide. On completion of feed of nitric acid-oleum mixture to the reactor, disregarding the 50% excess of sulfur, $HNO_3$, $SO_3$ and sulfur had been charged to the reaction in approximate mol proportion of 1 to 0.70 to 0.33 as compared with theoretical $HNO_3:SO_3:S$ ratios of 1 to 0.66 to 0.33. Sulfur trioxide was supplied in amount about 6% in excess of theoretical. On completion of nitric acid-oleum charging, the mixture in the reactor was further agitated and maintained at about the 85–95° C. temperature indicated for about 15–20 min., at which time color in the reactor changed from yellow to dark blue indicating end point of reaction.

Subsequent to the color change and while the liquor was still warm, about 7.2 gram atoms (232 g.) of unreacted sulfur were filtered out, and approximately 18,348 g. of liquid product were recovered (4797 g. of initial solution plus 13,551 g. of make). Sulfur consumption was about 23.6 gram atoms (723 g.), i.e. about 13% over stoichiometric requirements. Making allowance for the 4797 g. of solution initially charged to the reactor prior to addition of sulfur, liquid product recovery amounted to about 13,551 g. The final product was chemically analyzed for total $SO_3$, $N_2O_3$ and $HNO_3$, and was found to contain about 71.8% total $SO_3$, about 15.8% $N_2O_3$ and 12.4% of $H_2O$, and nil $HNO_3$. The composition of the product is determined from the analytical results on the basis of the equation $N_2O_3 + 2SO_3 + H_2O \rightarrow 2NO.HSO_4$; i.e. the $N_2O_3$ combines with part of the total $SO_3$ and water to $NO.HSO_4$ at ratios shown by the equation, while the remaining $SO_3$ and water combine to $H_2SO_4$ which serves as solvent for the $NO.HSO_4$. On the basis of analysis, the 13,551 g. of liquid product consisted of about 56.3 m (7153 g.) of $NO.HSO_4$, about 62.5 m (6385 g.) of $H_2SO_4$, and about 0.2 m (13 g.) of $SO_3$. Product yield was about 98.6% of the theoretical 13,759 g. value. Such material constitutes a typical preferred product of the invention process.

Example 2

Apparatus employed comprised a two-liter water-cooled glass reactor, equipped with an agitator and a thermometer. Sulfur was fed thru one neck which was open to the air and thru which $SO_2$ escaped. A mixed solution consisting of $HNO_3$, $H_2SO_4$ and $SO_3$ was made up. The $H_2SO_4$ and the $SO_3$ were supplied in the form of approximately 35% oleum. Proportions of $HNO_3$ and 35% oleum used were such as to provide a nitric acid-oleum mixture of approximately the following composition: 8.4 m (529 g.) of $HNO_3$; 9.0 m (886 g.) of $H_2SO_4$; and 6.0 m (480 g.) of $SO_3$. This mixture, of total weight of about 1895 g. was introduced into the reactor. Thereafter, about 3.9 gram atoms (125.5 g.) of ground sulfur, about 40% excess over the theoretical requirements of 2.8 gram atoms (89.5 g.) and having a particle size distribution of about 10–100 mesh, was added to the liquid in the reactor at a rate of about 0.01 gram atom (0.3 g.) per minute. On completion of feed of nitric acid-oleum mixture and sulfur to the reactor, disregarding the 40% excess of sulfur, $HNO_3$, $SO_3$ and sulfur had been charged to the reaction in approximate mol proportions of 1 to 0.71 to 0.33 as compared with theoretical $HNO_3$:$SO_3$:S ratios of 1 to 0.66 to 0.33. Sulfur trioxide was supplied in amount about 8% in excess of theoretical. Throughout the entire run, the mass in the reactor was agitated, and reaction temperature was held substantially in the range of 30–35° C. At this low temperature, there is substantially no hydrolysis of $NO.HSO_4$, and hence practically no formation or escape of $NO_2$. Total time of reaction was about 455 minutes, after which color in the reactor changed from yellow to dark blue indicating end point of reaction.

Subsequent to color change, about 0.2 gram atoms (6.5 g.) of unreacted sulfur were filtered out of the liquid product. Sulfur consumption was about 3.7 m (119 g.), i.e. about 32% over stoichiometric requirements, and was higher than in Example 1 because at lower temperatures oxidation of $SO_2$ to $SO_3$ by $HNO_3$ is slower. Liquid product recovery amounted to about 1940 g. The final product, analyzed as in Example 1, was found to contain about 70.5% total $SO_3$, about 15.6% $N_2O_3$, about 0.03% $HNO_3$ and 13.9% $H_2O$. On the basis of the foregoing analyses, the 1940 g. of liquid product consisted of about 7.9 m (1010 g.) of $NO.HSO_4$, about 9.1 m (897 g.) of $H_2SO_4$, and about 1.8 m (33 g.) of $H_2O$. Product yield was about 96.5% of theoretical.

Example 3

Apparatus employed was substantially the same as in Example 2. As in the latter, a mixed solution consisting of $HNO_3$, $H_2SO_4$ and $SO_3$ was made up. $H_2SO_4$ and $SO_3$ were supplied in the form of approximately 33% oleum. Proportions of $HNO_3$ and oleum used were such as to provide a nitric acid-oleum mixture of approximately the following composition: 8.0 m (504 g.) of $HNO_3$; 9.8 m (948 g.) of $H_2SO_4$; and 5.7 m (458 g.) of $SO_3$. This mixture, of total weight of about 1910 g., was introduced into the reactor. Thereafter about 3.4 gram atoms (110 g.) of ground sulfur, about 29% excess over the theoretical requirements of 2.7 gram atoms (85.3 g.) and having a particle size distribution of about 10–100 mesh, were added to the liquid in the reactor at a rate of about 0.016 gram atoms (0.5 g.) per minute. On completion of feed of nitric acid-oleum mixture and sulfur to the reactor, disregarding the 29% excess of sulfur, $HNO_3$, $SO_3$ and sulfur had been charged to the reaction in approximate mol proportions of 1 to 0.74 to 0.33 as compared with theoretical $HNO_3$:$SO_3$:S ratios of 1 to 0.66 to 0.33. Sulfur trioxide was supplied in amount about 12% in excess of theoretical. Throughout the entire run, the mass in the reactor was agitated, and reaction temperature was held substantially in the range of 48–52° C. Total time of reaction was about 220 minutes after which color in the reactor changed from yellow to dark blue indicating end point of reaction.

Subsequent to color change, about 0.19 gram atoms (6.0 g.) of unreacted sulfur were filtered out of the liquid product. Sulfur consumption was about 3.2 gram atoms (104 g.), i.e. about 22% over stoichiometric requirements. Liquid product recovery amounted to about 1950 g. The final product, analyzed as in Example 1, was found to contain about 71.6% total $SO_3$, about 14.3% $N_2O_3$, about 0.02% $HNO_3$ and 14.1% $H_2O$. On the basis of the foregoing analyses, the 1950 g. of liquid product consisted of about 7.3 m (933 g.) of $NO.HSO_4$, about 10.1 m (990 g.) of $H_2SO_4$, and about 1.5 m (27 g.) of $H_2O$. Product yield was about 97.6% of theoretical.

Example 4

Apparatus employed was substantially the same as in Example 1. About 8240 g. (4200 mls.) of liquid product of a previous run were charged into the reactor. A mixed solution consisting of $HNO_3$, $H_2SO_4$ and $SO_3$ was made up. The $H_2SO_4$ and the $SO_3$ were supplied in the form of approximately 29% oleum. Proportions of $HNO_3$ and 29% oleum used were such as to provide a nitric acid-oleum mixture of approximately the following composition: 46 m (2900 g.) of $HNO_3$; 52.8 m (5172 g.) of $H_2SO_4$; and 26.4 m (2113 g.) of $SO_3$, total weight of the mixture being about 10,185 g.

About 23.2 gram atoms (745 g.) of ground sulfur, about 50% excess over the theoretical requirements of 15.5 gram atoms (496 g.) and having a particle size distribution of about 10–100 mesh, were added to the liquid in the reactor, and the resulting agitated slurry was heated to about 70° C.

The above-described nitric acid-oleum mixture was fed into the top of the scrubbing column and thence into the reactor at a rate of about 140 g. per minute. On introduction of the mixture, temperature in the reactor began to rise. By extraneous cooling, reactor temperature was held substantially in the range of 85–95° C. throughout the entire run. As reaction initiated and thereafter, the gas space in the reactor was colored dark brown by evolved nitrous gases which rose into the scrubbing column. As the indicated rate of feed of nitric acid-oleum liquid to the column, substantially all nitrous gases were absorbed quantitatively by the downwardly flowing liquid mixture and were returned to the reactor. The only compound detected exiting the top of the scrubbing tower during the run was a relatively small amount of sulfur dioxide. On completion of feed of nitric acid-oleum mixture to the reactor, disregarding the 50% excess of sulfur, $HNO_3$, $SO_3$ and sulfur had been charged to the reaction in approximate mol proportion of 1 to 0.57 to 0.34 as compared with theoretical $HNO_3$:$SO_3$:S ratios of 1 to 0.66 to 0.33. Sulfur trioxide was supplied in amount about 14% short of theoretical. On completion of nitric acid-oleum charging, the mixture in the reactor was further agitated and maintained at about the 85–95° C. temperature indicated for about 20 min., at which time color in the reactor changed from yellow to dark blue indicating end point of reaction.

Subsequent to the color change, about 6.7 gram atoms (217 g.) of unreacted sulfur were filtered out, and approximately 18,690 g. of liquid product were recovered, 8240 g. of initial solution plus 10,450 g. of make. Sulfur consumption was about 16.5 m (528 g.), i.e. about 6.3% over stoichiometric requirements. Making allowance for the 8240 g. of solution initially charged to the reactor prior to addition of sulfur, liquid product recovery amounted to about 10,450 g. The final product was analyzed for total $SO_3$, $N_2O_3$ and $HNO_3$, and was found to contain about 72.1% total $SO_3$, about 15.7% $N_2O_3$ and 12.2% of $H_2O$. On the basis of analysis, the 10,450 g. of liquid product consisted of about 42.5 m (5400 g.) of $NO.HSO_4$, 51.6 m (5050 g.) of $H_2SO_4$, and a small amount of $SO_3$. Product yield was 97.6% of the theoretical 10,681 g. value.

We claim:
1. The process which comprises bringing together in a reaction zone reactants comprising nitric acid, oleum, and an amount of elemental sulfur at least equal to 0.33 mol proportion per mol of $HNO_3$ charged, said oleum having a free $SO_3$ strength of not more than 60%, and being in amount and of $SO_3$ strength such as (1) to supply to the reaction $SO_3$ in quantity in the range of about 75% less than to 75% more than 0.66 mol proportion of $SO_3$ per mol of $HNO_3$ charged, and (2) to provide in the ultimate liquid reaction product not less than about 0.8 mol of $H_2SO_4$ per mol of $HNO_3$ charged; reacting said nitric acid, oleum, and sulfur at temperature substantially in the range of 10–158° C. for a period of time sufficient to substantially complete reduction of $HNO_3$ and to effect conversion of liquid phase in the reaction mass to a bluish color.

2. The process which comprises bringing together in a reaction zone reactants consisting of nitric acid, oleum, and an amount of elemental sulfur in excess of 0.33 mol proportion per mol of $HNO_3$ charged, said oleum having a free $SO_3$ strength of not more than 60%, and being in amount and of $SO_3$ strength such as (1) to supply to the reaction $SO_3$ in quantity in the range of about 50% less than to 75% more than 0.66 mol proportion to $SO_3$ per mol of $HNO_3$ charged, and (2) to provide in the ultimate liquid reaction product not less than about one mol of $H_2SO_4$ per mol of $HNO_3$ charged; reacting said nitric acid, oleum, and sulfur at temperature substantially in the range of 10° C. to below the melting point of sulfur for a period of time sufficient to complete reduction of $HNO_3$ and to effect conversion of liquid phase in the reaction mass to a bluish color, and recovering from the resultant reaction mass liquid sulfuric acid solution of a nitrosyl sulfuric compound.

3. The process of claim 2 in which sulfur is charged in amount not less than about 10% in excess of 0.33 mol proportions per mol of $HNO_3$ charged.

4. The process of claim 2 in which the oleum has a free $SO_3$ strength of not less than about 15%.

5. The process of claim 2 in which the oleum has a free $SO_3$ strength substantially in the range of 15–50%.

6. The process of claim 2 in which temperature is substantially in the range of 20–100° C.

7. The process which comprises introducing into a reaction zone reactants consisting of nitric acid, oleum, and an amount of elemental sulfur in excess of 0.33 mol proportion per mol of $HNO_3$ charged, said oleum having a free $SO_3$ strength of not more than 60%, and being in amount and of $SO_3$ strength such as (1) to supply to the reaction $SO_3$ in quantity substantially in the range of 50% less than to 75% more than 0.66 mol proportions of $SO_3$ per mol of $HNO_3$ charged, and (2) to provide in the ultimate liquid reaction product not less than about one mol of $H_2SO_4$ per mol of $HNO_3$ charged; reacting said nitric acid, oleum, and sulfur in said zone at temperature substantially in the range of 10° C. to below the melting point of sulfur while maintaining in said zone nitrous gas constituents evolved during reaction, continuing reaction for a period of time sufficient to complete reduction of $HNO_3$ and to effect conversion of liquid phase in the reaction mass to a bluish color.

8. The process of claim 7 in which temperature is substantially in the range of 20–100° C.; sulfur is charged in amount not less than about 10% in excess of 0.33 mol proportions per mol of $HNO_3$ charged; and the oleum has a free $SO_3$ strength substantially in the range of 15–50%.

9. The process which comprises introducing into a reaction zone a suspension of elemental sulfur in liquid medium inert to herein reaction components and product, said sulfur being in amount in excess of 0.33 mol proportion per mol of $HNO_3$ charged to the process; forming a liquid mixture consisting of nitric acid and oleum, said oleum having a free $SO_3$ strength of not more than 60%, and being in amount and of $SO_3$ strength such as (1) to supply to the reaction $SO_3$ in quantity substantially in the range of 50% less than to 75% more than 0.66 mol proportion of $SO_3$ per mol of $HNO_3$ charged, and (2) to provide in the ultimate liquid reaction product not less than about one mol of $H_2SO_4$ per mol of $HNO_3$ charged; maintaining material in said zone at reaction temperature substantially in the range of 10° C. to below the melting point of sulfur; feeding said liquid mixture into said reaction zone thru an absorption zone countercurrent to flow therein of gases evolved in and exiting said reaction zone; regulating rate of feed of said mixture to and thru said absorption zone so as to absorb and return to said reaction zone nitrous gases evolved therein; continuing reaction for a period of time sufficient to complete reduction of $HNO_3$ and effect conversion of liquid phase in the reaction mass to a bluish color, and recovering from the resultant reaction mass liquid sulfuric acid solution of a nitrosyl sulfuric compound.

10. The process of claim 9 in which the oleum has a free $SO_3$ strength substantially in the range of 15–50%.

11. The process of claim 9 in which temperature is substantially in the range of 70–100° C.

12. The process of claim 9 in which sulfur is charged in amount not less than about 10% in excess of 0.33 mol proportion per mol of $HNO_3$ charged.

References Cited by the Examiner
UNITED STATES PATENTS
1,909,557   5/33   Van Hasselt _____ 202—186 XR JULIUS GREENWALD, *Primary Examiner.*

UNITED STATES PATENT OFFICE
CERTIFICATE OF CORRECTION

Patent No. 3,180,834

April 27, 1965

Bela I. Karsay et al.

It is hereby certified that error appears in the above numbered patent requiring correction and that the said Letters Patent should read as corrected below.

Column 2, line 21, for "liquir" read -- liquor --; line 34, for "$NHO_3$" read -- $HNO_3$ --; line 35, after "nitric" insert -- acid --; line 50, for "or" read -- of --; column 4, line 3, for "$H_4SO_2$" read -- $H_2SO_4$ --; line 49, for "eothexrmic" read -- exothermic --; column 5, line 57, for "whne" read -- when --; column 6, line 39, for "detceted" read -- detected --; column 9, line 27, for "to", second occurrence, read -- of --.

Signed and sealed this 28th day of September 1965.

(SEAL)
Attest:

ERNEST W. SWIDER
Attesting Officer

EDWARD J. BRENNER
Commissioner of Patents